Patented Nov. 4, 1947

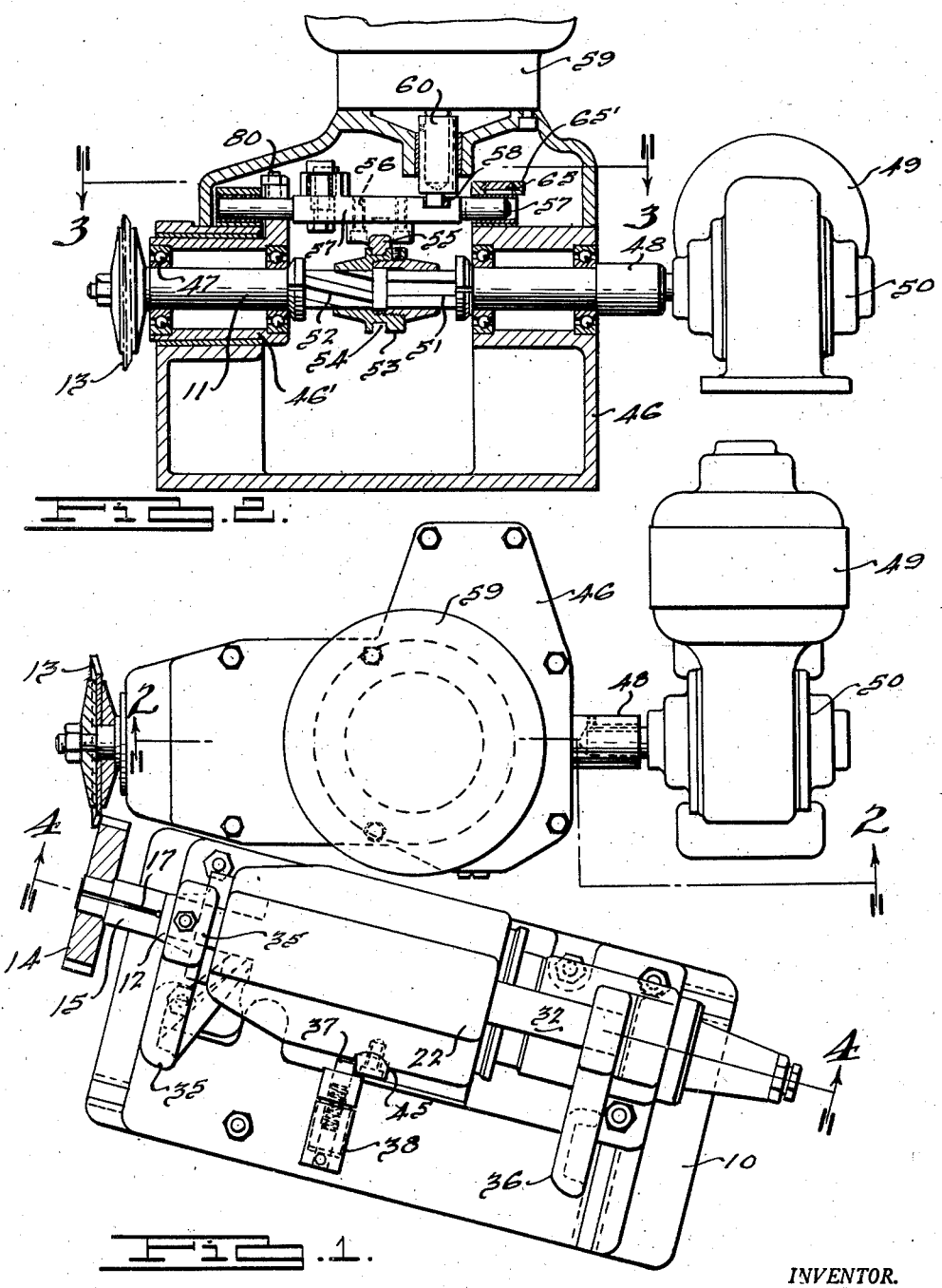

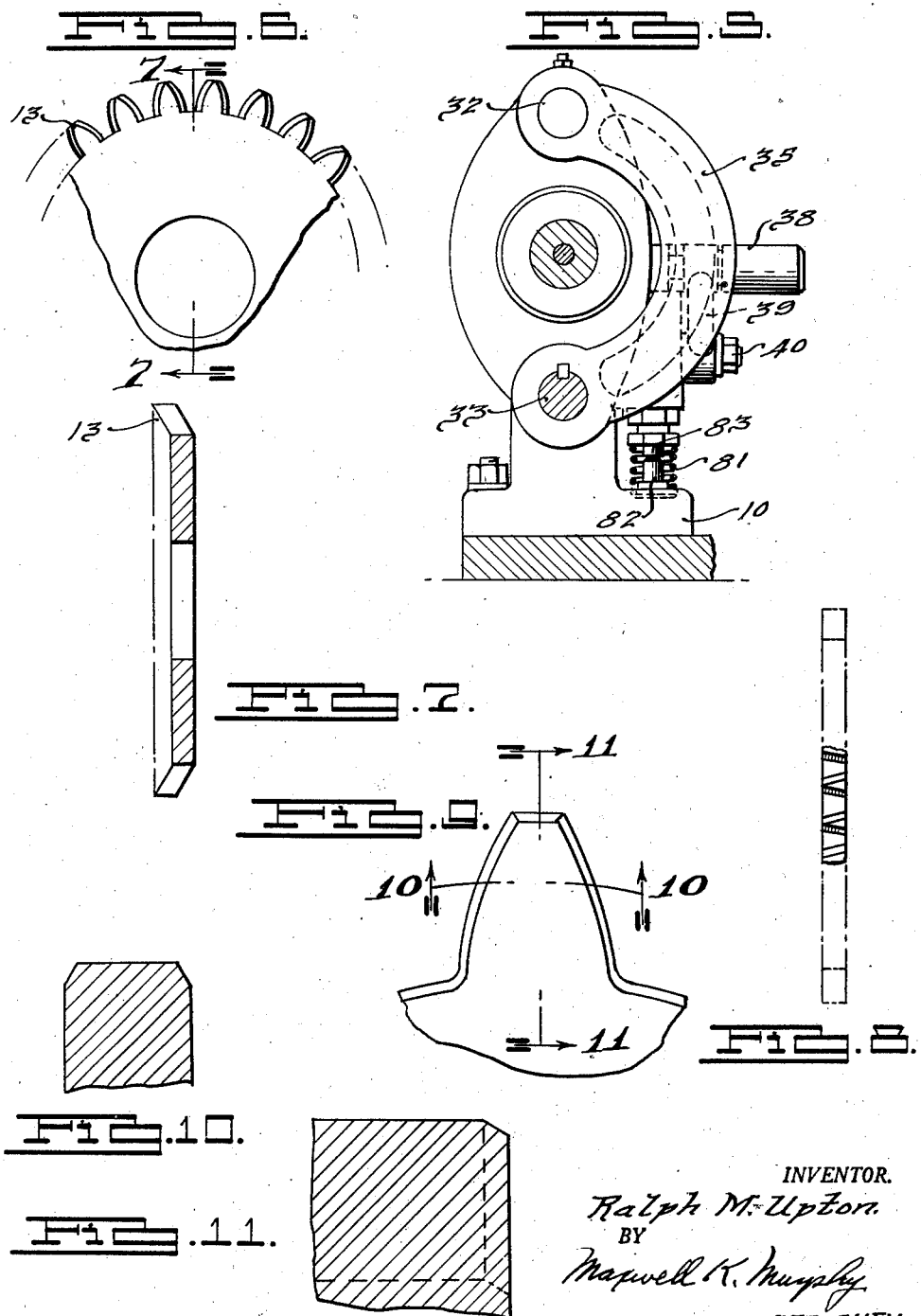

2,430,375

UNITED STATES PATENT OFFICE 2,430,375

ABRADING MACHINE FOR CHAMFERING GEARS

Ralph M. Upton, Detroit, Mich.

Application February 17, 1944, Serial No. 522,736.

15 Claims. (Cl. 51—31)

This invention relates to methods of chamfering gear teeth and apparatus therefor.

It is the principal object of the invention to provide improved means for chamfering the teeth of hardened gears.

Another object is to provide a gear tooth chamfering means that is quicker and more economical than those now in use and which eliminates the hand operations now employed.

Other objects and advantages will become apparent from the following description.

Fig. 1 is a plan view of my improved chamfering machine, certain parts being shown in section for clearness.

Fig. 2 is a section along the line 2—2 of Fig. 1.
Fig. 3 is a section along the line 3—3 of Fig. 2.
Fig. 4 is a section along the line 4—4 of Fig. 1.
Fig. 5 is a section along the line 5—5 of Fig. 4.
Fig. 6 is a plan view of one form of lapping gear for use with the machine.

Fig. 7 is a sectional view of the Fig. 6 lapping gear as indicated by the line 7—7.

Fig. 8 is a side elevational view of an alternate form of lapping gear.

Fig. 9 is a detail of a gear tooth that has been lapped by the tool.

Fig. 10 is a section on line 10—10 of Fig. 9, and Fig. 11 is a section on line 11—11 of Fig. 9.

Figure 3:
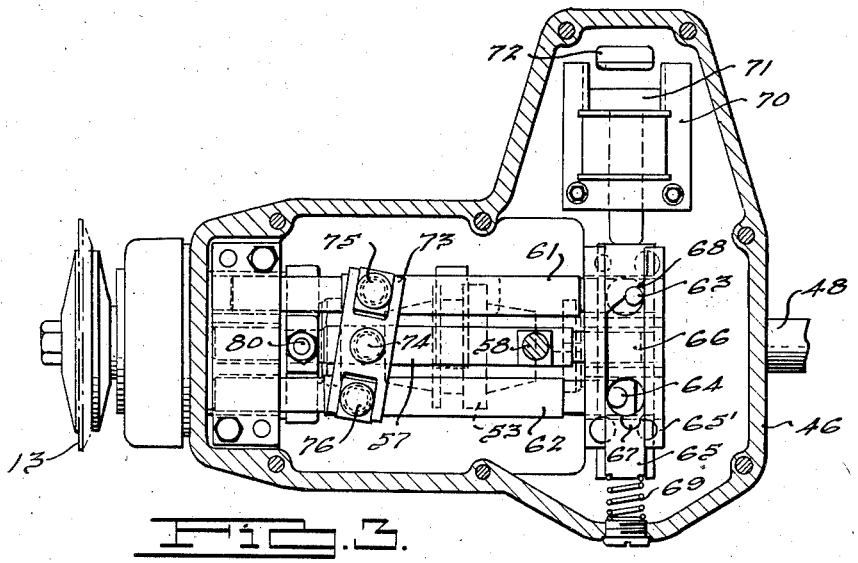

Referring to Figures 1 to 5 inclusive, it may be seen that my improved chamfering machine comprises a base structure 10 on which is mounted a pair of head structures 22 and 46. The head 46 (Fig. 2) has a rotatable cutter spindle 11 mounted therein by suitable anti-friction bearings 47 and carries a lapping tool 13 on its outer end. This tool has the shape of a spur gear and is preferably formed of abrasive grain bonded with a resinous material.

Figure 4:
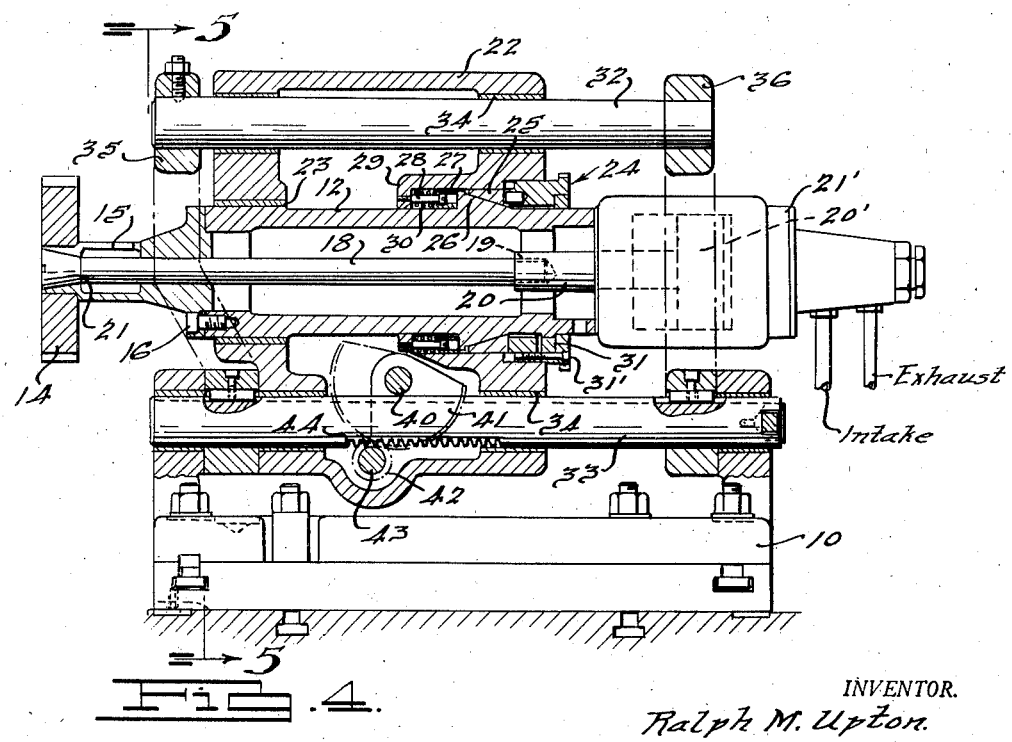

The head 22 (Fig. 4) carries a rotatable hollow spindle 12 adapted to mount a workpiece at one end. The workpiece, in this instance a spur gear, is fixed to the spindle 12 by means of an expanding arbor 15. The spindle 12 is hollow as shown in Fig. 4, the arbor 15 being attached thereto by threaded bolts 16. The arbor is split longitudinally at 17 and is expanded to tightly fit a workpiece by means of a bolt 18 which is threaded at 19 into a piston rod 20. The latter is operated by piston 20' which is reciprocable in fluid cylinder 21'. The fluid cylinder has intake and exhaust lines as shown and it is adapted to be operated by a pedal or other control (not shown).

The hollow spindle 12 is carried in a slidable frame 22, a bushing 23 rotatably supports the shaft near its forward end and the shaft is supported at its central portion by a combination bushing and brake mechanism generally designated by numeral 24. The latter comprises a conical bushing 25 which engages a conically shaped shoulder 26 formed on the spindle 12. The shoulder 26 has a forwardly facing flat portion which is engaged by a clutch pressure pad 27 attached by shoulder screws 28 to the inner part of a boss 29 forming part of frame 22.

The shoulder screws 28 each carry a coil spring 30 which forces shaft 12 rearwardly against the bushing 25. An adjustable threaded stop member 31 retains the parts in the assembled relation as shown in Fig. 4 and also provides for varying the braking effort. Member 31 is locked in the finally adjusted position by a sockethead screw 31'.

The entire frame assembly 22 is slidable on bars 32, 33 suitable anti-friction bushings 34 being provided. Bar 32 is supported from the main frame 10 by means of a pair of yoke shaped end members 35, 36.

Fig. 4 illustrated the head frame 22 in its forward position corresponding to Fig. 1. The head frame is locked in position against yoke 35 by a spring loaded plunger 37 which forms part of an operating lever handle 38 (see Figs. 4 and 5). The handle 38 is carried by a lever 39 which is oscillatably mounted on a shaft 40. Formed integrally with the lever is a sector member 41 having teeth which engage a pinion 42 mounted on a shaft 43 disposed perpendicular to and just below the bar 33. The bar 33 is provided with rack teeth 44 which also engage pinion 42.

A suitable wedge-shaped stop 45 is mounted on the body of the machine for engagement by the plunger 37. It can be seen that by grasping the handle 38 and withdrawing the plunger 37, the operator may withdraw the work from engagement with the tool 13 by throwing the lever 39 counter-clockwise, the sector 41 acting to multiply the motion and provide rapid rotation of the pinion 42 for quick action.

Referring now to Figs. 2 and 3, the shaft 11 is journaled in a sliding cage 46' by suitable antifriction bearings 47. A second shaft 48 is journaled in the rear portion of the head 46 in axial alignment with the shaft 11. Shaft 48 is adapted to be driven by an electric motor 49 through a gear box 50.

Shaft 48 is provided at its forward end with axial splines 51. Shaft 11 is provided at its rear end with helical splines 52. The two sets of splines are engaged by a sleeve connector 53 which is made in two parts for disassembly purposes as shown. Sleeve 53 thus serves as a power transmission member for transmitting the drive of shaft 48 to shaft 11 which carries the lap 13. It also has a second and important function which will be now described.

The sleeve 53 has a groove 54 engaged by a yoke 55 which is bolted at 56 to a longitudinally reciprocable bar 61 (Fig. 3). The latter is reciprocably mounted at each end in suitable bushings, and is engaged by an eccentric drive member 58 driven by an electric motor 59 through shaft 60.

Disposed in parallelism with the bar 61 are a pair of reciprocable bars 57 and 62 (Fig. 3). These bars are mounted similarly to bar 61. Bars 61 and 62 are each provided with an upwardly directed pin designated 63 and 64 respectively. A slidable mounted plate 65 provided with an elongated slot 66 is positioned over the ends of the bars in such manner that the pins 63, 64 are engaged in the slot. The slot is provided with notches 67, 68 disposed respectively in opposite ends thereof such that they are adapted to selectively engage the pins 63, 64 in accordance with the position of plate 65. The plate 65 is reciprocably mounted in the boss 65'.

A coil spring 69 urges the plate in one direction and a solenoid 70 having a plunger 71 is provided for shifting the plate in the opposite direction against the spring. A stop 72 limits movement of the solenoid plunger when the solenoid is deenergized.

The bar 57 carries a cross-head member 73 which is pivoted thereto at 74. This member is provided with oppositely disposed end slots which engage suitable square bushings carried by pins 75, 76 carried respectively by the bars 61 and 62. With the plate 65 in the position shown with the notch 68 engaged with the pin 63, bar 61 is locked against movement, and the yoke 55 will remain stationary even though the bar 57 is reciprocated by the eccentric 58.

The cage 46' is fastened to the bar 57 for reciprocation therewith by a screw 80 as is more clearly shown in Fig. 2. As the bar 57 is reciprocated horizontally by the eccentric 58, the cage 46' is likewise reciprocated and the lap 13 is moved over the work.

Deenergization of solenoid 70 will cause the spring 69 to shift plate 65 toward the top of Fig. 3 to thereby unlock bar 61 and lock bar 62 by engaging notch 67 with pin 64. Under these circumstances bar 61 and yoke 55 will be reciprocated with a stroke equal to twice the stroke of bar 57, the cross-head 73 oscillating about the pin 76 as a center. This will cause the sleeve 53 to reciprocate along the splines 51 and 52 and as the splines 52 are helical, the shaft 11 will have superimposed thereon an oscillatory helical motion which is in addition to the horizontal motion of the cage 46' and the rotation of shaft 48.

Figs. 6–8 inclusive illustrate two forms of lapping gear for use with the machine. The two forms differ in that in the Fig. 6 form the teeth are inclined at an angle to the face of the gear, which permits the use of a narrower lap in some instances. The lapping gears illustrated by way of example are 8 pitch gears having 24 teeth, a pitch diameter of 3 inches and a normal pressure angle of 20°. The flanks of the teeth are helically formed with a helix angle of 14° 28' the lead on one side of the teeth being right hand with left hand lead on the other side. The teeth are of normal thickness at the leading face of the lap only and taper rearwardly as shown in Fig. 9 such that the ends of the teeth are triangular in shape.

Figs. 9, 10 and 11 illustrate the chamfer produced on the teeth of the workpiece by the machine. With the arrangement described, any desired chamfer angle up to 15° and any desired width within plus or minus 10% may be produced. The form is produced after hardening and after the profile grinding of the teeth has been done.

Chamfer angles greater than 15% may be produced by slight alteration of the machine and both sides of the gear may be chamfered simultaneously by the use of two tool heads if desired.

The workpiece is urged into engagement with the lap by a coiled compression spring 81 (see Fig. 5) which is carried by a pair of axially aligned studs 82, 83. The head frame 22 is pivotally mounted in the bar 33 as can be seen from Fig. 4.

Operation of the machine is as follows:

With the head frame 22 in the retracted position and the arbor 15 contracted, a workpiece is placed on the arbor and the cylinder 21' actuated to shift the bar 18 toward the right of Fig. 4. This secures the workpiece firmly against rotation relative to shaft 12 and the workpiece 14 is engaged with the lap 13 by throwing the handle 38 in clockwise direction thus effecting shift of the frame 22 toward the left.

When rotation of the lap 13 is counter-clockwise viewed from the front, the solenoid 70 is energized to lock bar 61. This causes the teeth of the workpiece gear to be abraded, the brake 24 furnishing sufficient rotational resistance to produce good contact between the meshing teeth. As the bar 61 is locked against movement the sleeve 53 will not be reciprocated and the shaft 11 will reciprocate along with cage 46'. This will impart to the lap a right hand helical motion on the forward stroke thereof because of the helical splines 52.

Deenergization of the solenoid 70 will permit the spring 69 to unlock bar 61 and engage notch 67 with pin 64 to thereby lock bar 62. Coincident with deenergization of solenoid 70, a reversing switch (not shown) reverses the motion of the lap 13 and causes it now to rotate clockwise viewed from the front. Bar 61 will, under these circumstances, be reciprocated through a stroke of twice the amplitude of bar 57. This is caused by the cross-head 73 which pivots about the pin 76 as a center. The reciprocation of bars 57 and 61 will be in phase, that is in the same direction at the same time, but the stroke of bar 57 is only half that of bar 61. The result of this combined motion will cause the sleeve 53 to be reciprocated with a stroke of twice the amplitude of cage 46', and the helical motion thus superimposed on shaft 11 will result in a left hand helical motion of the lap on its forward stroke instead of a right hand motion as before.

The workpiece will therefore be abraded all around the O. D., the flanks of the teeth and at the root diameter as illustrated in Figs. 9–11. After the gear teeth have been chamfered sufficiently the handle 38 is thrown clockwise to permit unloading. The workpiece may then be turned around to permit chamfering the other side thereof, or as mentioned above, two lapping heads may be provided for lapping both ends simultaneously if desired.

Thus it may be seen that I have provided an improved apparatus for chamfering gear teeth in a rapid and economical manner with an automatic operating sequence which facilitates large quantity production with consistently good quality.

Having thus described a specific embodiment of my invention, I wish to point out that such has been done for illustrative purposes only and it is not intended to limit the breadth or scope of the invention in the broader aspects thereof except as set forth in the appended claims.

I claim:

1. In a gear finishing apparatus, a work spindle adapted to mount a gear; a gear shaped lap mounted on an axis inclined to the axis of said gear for engaging the same; means for rotating said lap, and means for superimposing upon the rotary motion thereof an oscillating helical motion.

2. In gear finishing apparatus, a rotatable work spindle adapted to mount a gear; a lap mounted for rotary engagement with said gear on an axis inclined relatively thereto, said lap having gear teeth curved helically along their flanks; means for rotating said lap; and means for axially reciprocating said lap.

3. As an article of manufacture, a rotary gear shaped lapping member adapted to lap a gear disposed in mesh therewith, said member having peripheral teeth of bonded abrasive material and said teeth having a constant pressure angle throughout their length and having helically curved flanks and wedge shaped ends.

4. As an article of manufacture, a rotary lapping member having the shape of an external gear and being adapted to lap the teeth of a workpiece gear in rotary engagement therewith, said lapping member having bonded abrasive teeth of constant pressure angle, one flank of said teeth being helically curved the axis of the helix being disposed at an angle to the axis of the lap equal to the helix angle of the workpiece teeth.

5. As an article of manufacture, a rotary lapping member having the shape of an external gear and being adapted to lap the teeth of a gear in rotary engagement therewith, the teeth of said lapping member having flanks curved in the direction of a right hand helix on one side and curved in the direction of a left hand helix on the opposite side.

6. In a gear lapping machine, a rotary gear shaped lap; a spindle for mounting a workpiece adapted to be engaged by said lap; a shiftable carriage for mounting said spindle; a rock bar; a pinion on said carriage disposed in mesh with said rack bar; a gear segment mounted on said machine in mesh with said pinion, and means for oscillating said segment thereby to rapidly shift said carriage.

7. In a gear lapping machine, a rotary gear shaped lap; a spindle for mounting a workpiece adapted to be engaged by said lap; an expanding arbor carried by said spindle; a fluid cylinder for actuating said arbor also carried on said spindle, yieldable means for urging the spindle toward said lap and means for shifting said spindle assembly axially for loading and unloading.

8. In a machine tool having a rotatable cutter spindle for mounting the tool, means for rotating said spindle, means for reciprocating said spindle axially; and means for superimposing rotary helical motion on said spindle during its rotary and reciprocating movement.

9. In a machine tool having a rotatable cutter spindle for mounting the tool, means for reciprocating said spindle axially; helical splines on one of said spindle; a driving shaft disposed in axial alignment with said shaft, said driving shaft having straight splines on the end adjacent said first shaft; a driving sleeve connecting said shaft and cutter spindle through said splines, and means for axially reciprocating said sleeve.

10. In a machine tool having a rotatable cutter spindle for mounting the tool, means for reciprocating said spindle axially; helical splines on one end of said spindle; a driving shaft disposed in axial alignment with said spindle, said driving shaft having straight splines on the end adjacent said spindle; a driving sleeve connecting said shafts through said splines, means for reciprocating said sleeve thereby to impart helical motion thereto during its rotation and reciprocation, and means for reciprocating said sleeve through twice the stroke of said spindle thereby to impart reverse helical motion to said shaft during its rotation and reciprocation.

11. In a machine tool having a rotatable cutter spindle for mounting the tool, means for reciprocating said spindle axially; said means comprising a reciprocable bar connected with said shaft; helical splines on said spindle; a driving shaft axially aligned therewith having straight splines thereon; a reciprocable sleeve connecting said two sets of splines; a second reciprocable bar for actuating said sleeve; a third reciprocable bar; a cross-head pivoted to said first bar and pivotally engaging the second and third bars; and means for selectively locking said second and third bar against movement.

12. The combination of claim 11 wherein the selective locking means comprises a reciprocable locking plate and a solenoid for actuating said plate.

13. The combination of claim 11 wherein the tool consists of a gear shaped lap having teeth helically curved along their flanks.

14. As an article of manufacture, a gear shaped lap of bonded abrasive material adapted to lap a workpiece gear in mesh therewith, the teeth of said lap having a constant pressure angle and having helically curved flanks and triangularly shaped ends, the bisector of the triangle being disposed at an angle to the axis of the lap equal to the helix angle of the teeth of the workpiece.

15. A gear tooth chamfering machine having a spindle; a rotatable toothed lap mounted on an axis inclined to the axis of the spindle and adapted to engage the teeth of the workpiece gear, one flank of the respective teeth of said lap being curved in the direction of a right hand helix and the opposite flanks thereof being curved in the direction of a left hand helix, and means for imparting helical motion to said lap.

RALPH M. UPTON.

REFERENCES CITED

The following references are of record in the file of this patent:

UNITED STATES PATENTS

| Number | Name | Date |
| --- | --- | --- |
| 1,749,704 | Hoke | Mar. 4, 1930 |
| 2,105,896 | Stubbs | Jan. 18, 1938 |
| 2,165,386 | Klomp | July 11, 1939 |
| 2,227,491 | Drummond | Jan. 7, 1941 |
| 2,176,316 | Swanson | Oct. 17, 1939 |
| 2,195,052 | Wallace | Mar. 26, 1940 |
| 2,294,733 | Brady | Sept. 1, 1942 |
| 2,025,885 | Nenninger et al. | Dec. 31, 1935 |
| 2,092,895 | Stevens | Sept. 14, 1937 |
| 1,912,216 | Page | May 30, 1933 |
| 1,948,071 | Hofmann et al. | Feb. 20, 1934 |
| 1,989,651 | Drummond | Jan. 29, 1935 |
| 2,111,045 | Drummond | Mar. 15, 1938 |

FOREIGN PATENTS

| Number | Country | Date |
| --- | --- | --- |
| 309,870 | Great Britain | May 22, 1930 |